United States Patent [19]
Davis

[11] Patent Number: 5,982,878
[45] Date of Patent: Nov. 9, 1999

[54] COMBINED LOOP CURRENT SINK, BATTERY DETECTOR, AND RINGING DETECTOR CIRCUIT

[75] Inventor: Jeffrey M. Davis, Manassas, Va.

[73] Assignee: Hubbell Incorporated, Orange, Conn.

[21] Appl. No.: 08/857,220

[22] Filed: May 15, 1997

[51] Int. Cl.⁶ ................................................ H04M 1/00
[52] U.S. Cl. .................... 379/379; 379/377; 379/382; 379/399
[58] Field of Search ................... 379/377, 379, 379/382, 380, 399

[56] References Cited

U.S. PATENT DOCUMENTS

| | | | |
|---|---|---|---|
| 4,317,963 | 3/1982 | Chea, Jr. ................................. | 379/377 |
| 4,558,183 | 12/1985 | Corris et al. ........................... | 179/56.1 |
| 4,731,827 | 3/1988 | Wood ..................................... | 379/377 |
| 4,864,605 | 9/1989 | Ramsay et al. ......................... | 379/379 |
| 4,903,263 | 2/1990 | Patel et al. ............................. | 370/259 |
| 5,020,100 | 5/1991 | Gardiner ................................ | 379/379 |
| 5,134,611 | 7/1992 | Steinka et al. ......................... | 370/466 |
| 5,245,654 | 9/1993 | Wilkison et al. ...................... | 379/405 |
| 5,323,460 | 6/1994 | Warner et al. ......................... | 379/399 |
| 5,428,682 | 6/1995 | Apfel ..................................... | 379/413 |
| 5,448,636 | 9/1995 | Andreini et al. ....................... | 379/422 |
| 5,600,715 | 2/1997 | Bingel ................................... | 379/393 |
| 5,619,567 | 4/1997 | Apfel ..................................... | 379/413 |
| 5,675,640 | 10/1997 | Tappert et al. ......................... | 379/373 |
| 5,828,666 | 11/1998 | Focsaneanu et al. ................... | 370/389 |
| 5,848,149 | 12/1998 | Chen et al. ............................. | 379/399 |

*Primary Examiner*—Krista Zele
*Assistant Examiner*—Roland Foster
*Attorney, Agent, or Firm*—Jerry M. Presson; William C. Roch

[57] ABSTRACT

A combined loop current sink, battery detector, and ringing detector circuit as used in a channel unit at a telephone central office connection to a digital loop carrier circuit, to provide off-hook and on-hook signaling to analog switching circuits, and to simultaneously receive normal battery and ringing signals from the analog switching circuits. The combined circuit includes tip and ring connections to the digital loop carrier circuit to provide telephone service, a loop input controlled by logic circuits, at the telephone central office, and a battery output connected to the logic circuits. A first optocoupler, is connected to the loop input and also to ground, for providing a floating voltage coupling for the loop input to the circuit. A second optocoupler, is connected to the battery output and also to ground, for providing a floating voltage coupling for the circuit output. A transistor circuit has an input coupled to the first optocoupler and an output coupled to the second optocoupler. The logic circuits send an on-hook signal by applying a zero volt ground signal to the loop input so that no current flows through the first optocoupler, and an off-hook signal by a positive volt signal to same input so current flows through the first optocoupler.

16 Claims, 1 Drawing Sheet

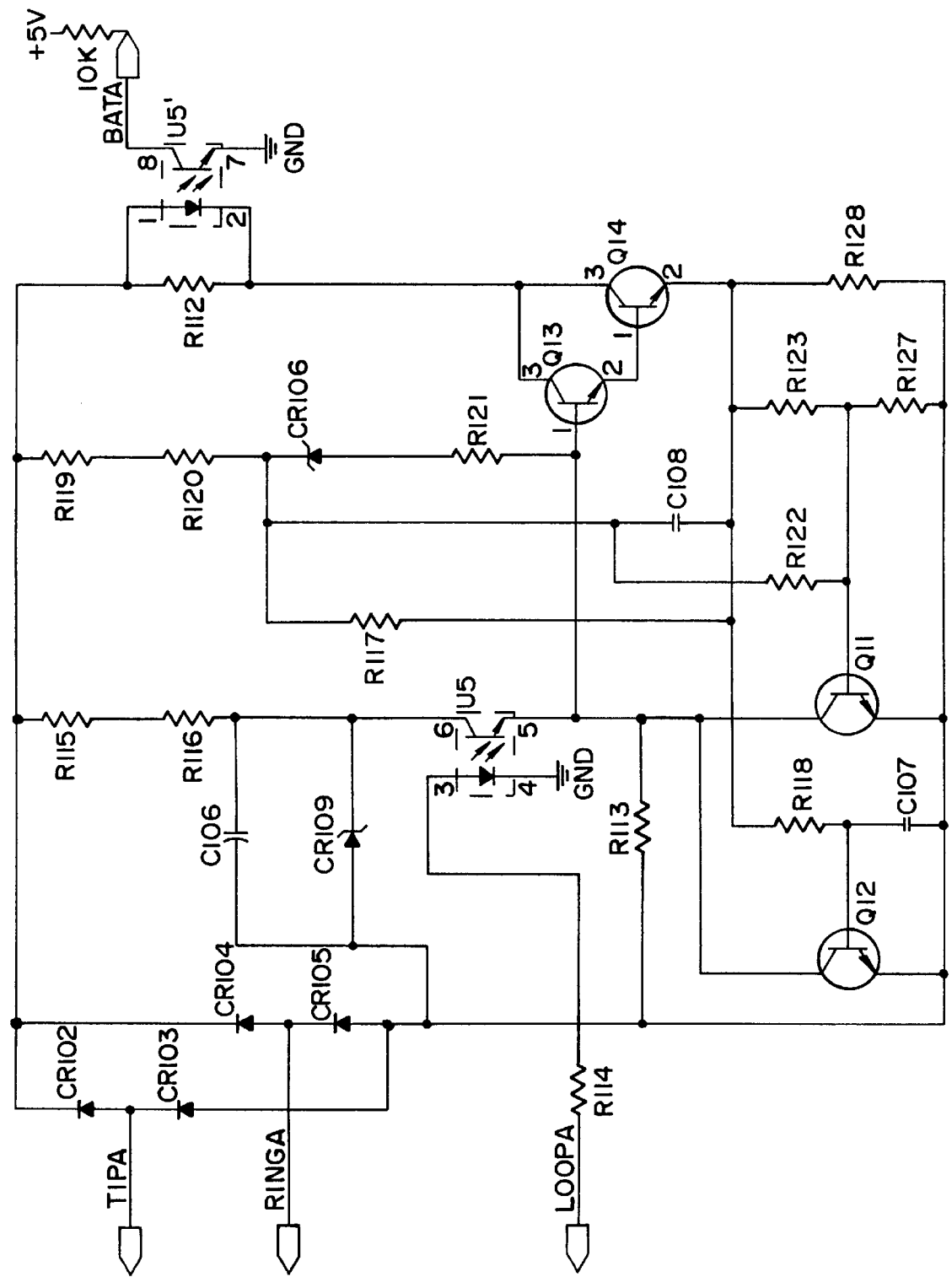

COMBINED LOOP CURRENT SINK, BATTERY DETECTOR, AND RINGING DETECTOR CIRCUIT

BACKGROUND OF THE INVENTION

1. Field of the Invention

The present invention relates generally to a combined loop current sink, battery detector, and ringing detector circuit, and more particularly pertains to a combined loop current sink, battery detector, and ringing detector circuit as used at a telephone central office connection to a digital loop carrier circuit, to provide off-hook and on-hook signaling to analog switching circuits, and to simultaneously receive normal battery and ringing signals from the analog switching circuits.

2. Discussion of the Prior Art

The prior art has utilized individual circuits to provide a loop current sink function, a battery detector function and a ringing detector function. The prior art has not utilized one single comprehensive circuit to provide the combined functions of a loop circuit sink, battery detector and ringing detector, particularly in a relatively simple and inexpensive circuit as disclosed and taught by the present invention. Moreover, prior art circuits do not provide floating voltage connections to the input and output terminals of the circuits as in the present invention.

SUMMARY OF THE INVENTION

Accordingly, it is a primary object of the present invention to provide a combined loop current sink, battery detector, and ringing detector circuit.

A further object of the subject invention is the provision of a combined loop current sink, battery detector, and ringing detector circuit as used at a telephone central office connection to a digital loop carrier circuit to provide off-hook and on-hook signaling to analog switching circuits, and to simultaneously receive normal battery and ringing signals from the analog switching circuits.

In accordance with the teachings herein, the present invention provides a combined loop current sink, battery detector, and ringing detector circuit used in a connection to a digital loop carrier circuit providing telephone service to customers. The combined circuit provides off-hook and on-hook signaling to analog switching circuits, as are present at a telephone central office, and simultaneously receives normal battery and ringing signals from the analog switching circuits. The combined circuit includes tip and ring connections to the digital loop carrier circuit to provide telephone service, a loop input controlled by logic circuits, as are present at the telephone central office, and a battery output connected to the logic circuits. A first optocoupler, having a light emitting diode, is connected to the loop input and also to ground, for coupling the loop input to the circuit while providing a floating voltage coupling therebetween. A second optocoupler, having a light emitting diode, is connected to the battery output and also to ground, for coupling the circuit output to the battery output while providing a floating voltage coupling therebetween. A transistor circuit has an input coupled to the first optocoupler and an output coupled to the second optocoupler. The logic circuits send an "on-hook" signal by applying a zero volt ground signal to the loop input so that no current flows through the diode of the first optocoupler, which causes a high impedance to exist at the output of the first optocoupler and causes the transistor circuit to be nonconductive, and the circuit to present a DC and AC high impedance to the tip and ring connections and high impedance to the battery output. The logic circuits send an "off-hook" signal by applying a positive voltage signal to the loop input so that current flows through the diode of the first optocoupler, which causes a low impedance at the output of the first optocoupler which turns the transistor circuit on and causes a current through the tip and ring connections and brings the battery output to a low impedance state.

In greater detail, the combined circuit is used at a telephone central office, and the analog switching circuits and the logic circuits are at the telephone central office. More particularly, the combined circuit is used in a channel unit at the telephone central office, and the channel unit also includes the logic circuits. In a typical installation, the channel unit includes a plurality of such combined circuits.

The battery output is tied to a positive voltage through a pull-up resistor in the logic circuits of the channel unit, such that the logic circuits interpret a high impedance state of the battery output as a positive voltage state. A 0 volt signal on the battery output during the application of a positive volt signal to the loop input is interpreted by the channel unit logic circuits as a normal battery state wherein battery and battery current are present at the tip and ring connections. The presence of a high impedance at the battery output during the application of a positive volt signal to the loop input is interpreted by the channel unit logic circuits as a forward disconnect wherein no battery current is present at the tip and ring connections.

A ringing voltage is detected when the circuit is on-hook and the AC voltage between the tip and ring connections rises to a voltage level greater than a threshold voltage. When the AC voltage between the tip and ring connections is greater than the threshold, the circuit produces a square wave output at the battery output which toggles between a low impedance and a high impedance. The square wave output is interpreted by the channel unit logic circuits as a ringing condition.

After a transition from an on-hook to an off-hook state, wherein the loop input transitions from ground to a positive volt signal, with a battery voltage at the tip and ring connections, the tip and ring current through the circuit is limited in two steps. The current is limited to less than substantially 45 mA for the first approximately 100 ms after the transition from on-hook to off-hook, and after 100 ms the tip and ring current is limited to less than substantially 35 mA.

A resistor and capacitor filter circuit provides low-pass filtering for the transistor circuit from the effects of voice frequencies at the tip and ring connections, which gives the circuit a high voice frequency impedance at the tip and ring connections. A zener diode limits the voltage across the capacitor in the filter circuit to prevent damage thereto by battery voltages when the circuit is in an on-hook state.

BRIEF DESCRIPTION OF THE DRAWINGS

The foregoing objects and advantages of the present invention for a combined loop current sink, battery detector, and ringing detector circuit may be more readily understood by one skilled in the art with reference being had to the following detailed description of a preferred embodiment thereof, taken in conjunction with the accompanying drawing which is a schematic circuit of an exemplary embodiment of a combined loop current sink, battery detector, and ringing detector circuit pursuant to the teachings of the present invention.

DETAILED DESCRIPTION OF THE DRAWINGS

Referring to the drawings in detail, the FIGURE illustrates a circuit used in a channel unit at a telephone company central office, and wherein the TIPA and RINGA leads interface to analog switching circuits located at the telephone company central office. Each channel unit typically has a multiple number of channels, such as 2, 4 or 8 channels, with each channel having a separate circuit as illustrated in the FIGURE. LOOPA is an input controlled by logic circuits in the channel unit, and BATA is an output that connects to logic circuits in the channel unit. In the present application, the BATA connection is tied to 5 volts through a 10 Kohm pull-up resistor in the logic circuits of the channel unit. This is done so that the logic circuits will interpret the high impedance state of the BATA pin as a 5 volt state.

Diodes CR102, CR103, CR104, and CR105, which form a rectifier bridge circuit, are present so that the circuit will operate properly with either battery polarity across the TIPA and RINGA inputs.

If the channel unit is to send an "on-hook" signal, the channel unit logic circuit applies a 0 volt (ground) signal to the input at LOOPA so that no current flows through the diode (pins 3–4) of a first optocoupler U5. This causes a high impedance to exist between the output pins 5–6 of the optocoupler U5 which causes a transistor circuit comprising Q11, Q12, Q13, and Q14 to all be off (no current). The result of this is that the circuit presents both a DC and AC high impedance to the TIPA-RINGA connection interface. In this state, the output BATA presents a high impedance also because there is no current through the diode (pins 1–2) of a second optocoupler U5'.

If the channel unit is to send an "off-hook" signal, the channel unit logic circuit applies a positive 5 volt signal to the input at LOOPA so that current flows through the diode (pins 3–4) of the first optocoupler U5. This causes a low impedance between the output pins 5–6 of the optocoupler U5 which causes a current to flow through R115, R116 and into the base (pin 1) of Q13, which in turn causes a current into the base (pin 1) of Q14. The current into the base of Q14 causes a current through the collector-emitter junction (pins 3–2) of Q14, R128, R112, diode (pins 1–2) of the second optocoupler U5', and CR102–CR105. This constitutes a current between TIPA and RINGA. The current through the diode (pins 1–2) of the second optocoupler U5' causes a low impedance between pins 7–8 of U5'; this brings the output at the BATA pin to 0 volts (ground).

In the present application, the 0 volt signal on the BATA pin during the application of a 5 volt signal to the LOOPA pin is interpreted by the channel unit logic as a "normal battery" state. This simply means that there is battery and battery current at TIPA-RINGA. If there were no battery at TIPA-RINGA there would be no current; and therefore BATA would present a high impedance. A high impedance at BATA during the application of 5 volt signal to the LOOPA pin is interpreted by the channel unit logic as a "forward disconnect". This simply means that there is no battery current at TIPA-RINGA.

During a transition from on-hook to off-hook (LOOPA=0 volts to LOOPA=5 volts) with a battery voltage present at the TIPA-RINGA interface, the TIPA-RINGA current through the circuit is limited in two steps. For the first 100 ms after a transition, the current is limited to less than 45 mA by R123, R127, R128, and Q11. After 100 ms the TIPA-RINGA current is limited to less than 35 mA by R118, C107, R128, and Q12. The short term current limit is set to the higher value of 45 mA to shorten the on-hook to off-hook delays, and ring trip delays. The long term current limiter is set to the lower value of 35 mA to keep power dissipation at the central office low for the "talk" period of a telephone call.

R115, R116, and C106 are used to low-pass filter the base of Q13 from the effects of voice frequencies at the TIPA-RINGA connections. This gives the circuit a very high voice frequency impedance at the TIPA-RINGA interface. A zener diode CR109 limits the voltage across C106 to 36 volts so as not to damage the capacitor with battery voltages when the circuit is in the "on-hook" state. R113 is used to provide stability, and removes charge from the base (pin 1) of Q13 during off-hook to on-hook transitions, or conditions where neither Q11 nor Q12 are providing current limiting functions (i.e. TIPA-RINGA current less than 35 mA).

A ringing voltage is detected when the circuit is on-hook and the voltage between TIPA and RINGA rises to a level greater than 110 volts. This threshold is set by R119, R120, R117, R121, and CR106. When the TIPA-RINGA voltage is greater than the threshold (during peaks of ringing), a current is injected into the base (pin 1) of Q13 through CR106. This in turn produces a current through Q14 and the diode (pins 1–2) of the second optocoupler U5' as in the case of "off-hook". The momentary currents produced by this peak detector produce a square wave output at BATA which toggles between a low impedance (0 volts or ground) and a high impedance. This square wave output is interpreted by the channel unit logic circuits as "ringing".

C108 is used in conjunction with R119 and R120 to low-pass filter the base (pin 1) of Q13 from voice frequencies at the TIPA-RINGA connections. R122 is used to control the on-hook ringing impedance by injecting current into the current limiter Q11 during the peaks of ringing signals.

While a preferred embodiment of the present invention for a combined loop current sink, battery detector, and ringing detector circuit are described in detail herein, it should be apparent that the disclosure and teachings of the present invention will suggest many alternative designs to those skilled in the art.

What is claimed is:

1. A combined loop current sink, battery detector, and ringing detector circuit used in a connection to a digital loop carrier circuit providing telephone service to customers, to provide off-hook and on-hook signaling to analog switching circuits and to simultaneously receive normal battery and ringing signals from the analog switching circuits, comprising:

a. said circuit having a tip connection and a ring connection to the digital loop carrier circuit to provide telephone service, a loop input controlled by logic circuits, and a battery output connected to the logic circuits;

b. a first optocoupler, having a light emitting diode, connected to the loop input and also to ground, for coupling the loop input to the circuit while providing a floating voltage coupling between the loop input and the circuit;

c. a second optocoupler, having a light emitting diode, connected to the battery output and also to ground, for coupling the circuit output to the battery output while providing a floating voltage coupling between the circuit and the battery output;

d. a transistor circuit having an input coupled to the first optocoupler and an output coupled to the second optocoupler;

e. the logic circuits send an on-hook signal by applying a zero volt ground signal to the loop input so that no current flows through the diode of the first optocoupler, which causes a high impedance to exist at the output of the first optocoupler and causes the transistor circuit to be nonconductive, and the circuit to present a DC and AC high impedance to the tip and ring connections and a high impedance to the battery output;

f. the logic circuits send an off-hook signal by applying a positive volt signal to the loop input so that current flows through the diode of the first optocoupler, which causes a low impedance at the output of the first optocoupler which turns the transistor circuit on and causes a current through the tip and ring connections and brings the battery output to a low impedance states;

g. the logic circuits interpret voltage signals and impedance at the battery output as indicative of the state of the battery, and voltage signals at the battery output as indicative of a ringing voltage.

2. A combined loop current sink, battery detector, and ringing detector circuit as claimed in claim 1, wherein the combined circuit is used at a telephone central office, and the analog switching circuits and the logic circuits are at the telephone central office.

3. A combined loop current sink, battery detector, and ringing detector circuit as claimed in claim 2, wherein the combined circuit is used in a channel unit at the telephone central office, and the channel unit also includes the logic circuits.

4. A combined loop current sink, battery detector, and ringing detector circuit as claimed in claim 3, wherein the channel unit includes a plurality of said combined circuits.

5. A combined loop current sink, battery detector, and ringing detector circuit as claimed in claim 3, wherein the battery output is tied to a positive voltage through a pull-up resistor in the logic circuits of the channel unit, such that the logic circuits interpret a high impedance state of the battery output as a positive voltage state.

6. A combined loop current sink, battery detector, and ringing detector circuit as claimed in claim 3, wherein a 0 volt signal on the battery output during the application of a positive volt signal to the loop input is interpreted by the channel unit logic circuits as a normal battery state wherein battery and battery current are present at the tip and ring connections.

7. A combined loop current sink, battery detector, and ringing detector circuit as claimed in claim 6, wherein the presence of a high impedance at the battery output during the application of a positive volt signal to the loop input is interpreted by the channel unit logic circuits as a forward disconnect wherein no battery current is present at the tip and ring connections.

8. A combined loop current sink, battery detector, and ringing detector circuit as claimed in claim 7, wherein a ringing voltage is detected when the circuit is on-hook and the voltage between the tip and ring connections rises to a voltage level greater than a threshold voltage, and when the voltage between the tip and ring connections is greater than the threshold, the circuit produces a square wave output at the battery output which toggles between a low impedance and a high impedance, and the square wave output is interpreted by the channel unit logic circuits as a ringing condition.

9. A combined loop current sink, battery detector, and ringing detector circuit as claimed in claim 8, including means for limiting the tip and ring current through the circuit in two steps after a transition from an on-hook to an off-hook state, during which the loop input proceeds from ground to the application of a positive volt signal, with a battery voltage present at the tip and ring connections.

10. A combined loop current sink, battery detector, and ringing detector circuit as claimed in claim 9, wherein the limiting means limits the current to less than substantially 45 mA for the first approximately 100 ms after the transition from on-hook to off-hook, wherein the loop input transitions from ground to a positive volt signal, and after 100 ms limits the tip and ring current to less than substantially 35 mA.

11. A combined loop current sink, battery detector, and ringing detector circuit as claimed in claim 1, wherein a resistor and capacitor filter circuit provides low-pass filtering for the transistor circuit from the effects of voice frequencies at the tip and ring connections, which gives the circuit a high voice frequency impedance at the tip and ring connections.

12. A combined loop current sink, battery detector, and ringing detector circuit as claimed in claim 11, wherein a zener diode limits the voltage across the capacitor in the resistor and capacitor filter circuit to prevent damage to the capacitor by battery voltages when the circuit is in an on-hook state.

13. A combined loop current sink, battery detector, and ringing detector circuit as claimed in claim 3, wherein the presence of a high impedance at the battery output during the application of a positive volt signal to the loop input is interpreted by the channel unit logic circuits as a forward disconnect wherein no battery current is present at the tip and ring connections.

14. A combined loop current sink, battery detector, and ringing detector circuit as claimed in claim 1, wherein a ringing voltage is detected when the circuit is on-hook and the voltage between the tip and ring connections rises to a voltage level greater than a threshold voltage, and when the voltage between the tip and ring connections is greater than the threshold, the circuit produces a square wave output at the battery output which toggles between a low impedance and a high impedance, and the square wave output is interpreted by the channel unit logic circuits as a ringing condition.

15. A combined loop current sink, battery detector, and ringing detector circuit as claimed in claim 1, including means for limiting the tip and ring current through the circuit in two steps after a transition from an on-hook to an off-hook state, during which the loop input proceeds from ground to the application of a positive volt signal, with a battery voltage present at the tip and ring connections.

16. A combined loop current sink, battery detector, and ringing detector circuit as claimed in claim 15, wherein the limiting means limits the current to less than substantially 45 mA for the first approximately 100 ms after the transition from on-hook to off-hook, wherein the loop input transitions from ground to a positive volt signal, and after 100 ms limits the tip and ring current to less than substantially 35 mA.

* * * * *